(12) United States Patent
Zhang et al.

(10) Patent No.: US 10,382,111 B2
(45) Date of Patent: Aug. 13, 2019

(54) BEAM INTERPOLATION IN MASSIVE MIMO SYSTEMS

(71) Applicant: Intel IP Corporation, Santa Clara, CA (US)

(72) Inventors: Yushu Zhang, Beijing (CN); Yuan Zhu, Beijing (CN); Huaning Niu, Milpitas, CA (US); Qinghua Li, San Ramon, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/758,305

(22) PCT Filed: Dec. 22, 2015

(86) PCT No.: PCT/US2015/067320
§ 371 (c)(1),
(2) Date: Mar. 7, 2018

(87) PCT Pub. No.: WO2017/048311
PCT Pub. Date: Mar. 23, 2017

(65) Prior Publication Data
US 2018/0269945 A1    Sep. 20, 2018

Related U.S. Application Data

(63) Continuation of application No. PCT/CN2015/089626, filed on Sep. 20, 2015.

(51) Int. Cl.
*H04B 7/06* (2006.01)
*H04B 7/0408* (2017.01)
(Continued)

(52) U.S. Cl.
CPC ......... *H04B 7/0617* (2013.01); *H04B 7/0408* (2013.01); *H04B 7/0626* (2013.01);
(Continued)

(58) Field of Classification Search
CPC .. H04B 7/0617; H04B 7/0626; H04B 7/0632; H04B 7/0695; H04B 7/0408; H04W 16/28; H04W 76/27
See application file for complete search history.

(56) References Cited

U.S. PATENT DOCUMENTS

| 7,676,007 B1 | 3/2010 | Choi et al. |
| 2009/0115650 A1* | 5/2009 | Tietjen ................. H04B 1/0007 341/141 |

(Continued)

FOREIGN PATENT DOCUMENTS

TW     201720071 A    6/2017

OTHER PUBLICATIONS

"International Application Serial No. PCT/US2015/067320, International Search Report dated Mar. 10, 2016", 3 pgs.
(Continued)

*Primary Examiner* — Kenneth T Lam
(74) *Attorney, Agent, or Firm* — Schwegman Lundberg & Woessner, P.A.

(57) ABSTRACT

Embodiments described herein include devices, methods, and instructions for managing beam interpolation in massive multiple-input multiple-output (MIMO) communications. In one example embodiment, an evolved node B is configured to transmit to a UE using massive MIMO by transmitting multiple beamformed reference signals on multiple transmission beams each associated with a different plurality of antennas. The eNB receives beam interpolation information back from the UE, and then generates a data transmission that is sent to the UE using an interpolated transmission beam from a first and second transmission beam.

25 Claims, 9 Drawing Sheets

(51) Int. Cl.
*H04W 76/27* (2018.01)
*H04W 16/28* (2009.01)
(52) U.S. Cl.
CPC ......... *H04B 7/0632* (2013.01); *H04B 7/0695* (2013.01); *H04W 16/28* (2013.01); *H04W 76/27* (2018.02)

(56) References Cited

U.S. PATENT DOCUMENTS

| | | | |
|---|---|---|---|
| 2012/0027111 A1 | 2/2012 | Vook et al. | |
| 2015/0049824 A1 | 2/2015 | Kim et al. | |
| 2015/0236772 A1* | 8/2015 | Hammarwall | H04B 7/0617 370/329 |
| 2015/0303741 A1* | 10/2015 | Malik | H04B 5/0037 307/104 |
| 2016/0191176 A1* | 6/2016 | O'Keeffe | H01Q 3/267 455/63.4 |
| 2018/0241445 A1* | 8/2018 | Li | H03M 1/26 |

OTHER PUBLICATIONS

"International Application Serial No. PCT/US2015/067320, Written Opinion dated Mar. 10, 2016", 8 pgs.
"International Application Serial No. PCT/US2015/067320, International Preliminary Report on Patentability dated Mar. 29, 2018", 10 pgs.

\* cited by examiner

BEAM INTERPOLATION IN MASSIVE MIMO SYSTEMS

PRIORITY CLAIM

This application is a U.S. National Stage Filing under 35 U.S.C. 371 from International Application No. PCT/US2015/067320, filed Dec. 22, 2015 and published in English as WO 2017/048311 on Mar. 23, 2017, which is a continuation of and claims priority under 35 U.S.C. 120 to International Application No. PCT/CN2015/089626 filed on Sep. 15, 2015 entitled "BEAM INTERPOLATION IN MASSIVE MIMO SYSTEM", each of which is incorporated herein by reference in its entirety.

TECHNICAL FIELD

Embodiments pertain to systems, methods, and component devices for wireless communications, and particularly to systems and methods managing massive multiple-input multiple-output (MIMO) beams and beam interpolation in long term evolution (LTE), LTE-advanced, and other similar wireless communication systems.

BACKGROUND

LTE and LTE-advanced are standards for wireless communication of high-speed data for user equipment (UE) such as mobile telephones. In LTE, LTE-advanced and various wireless systems, MIMO is a technology that uses multipath signal propagation to communicate multiple signals to a device on the same or on overlapping frequencies that would interfere with each other if they were on the same path.

DETAILED DESCRIPTION

Figure 1:
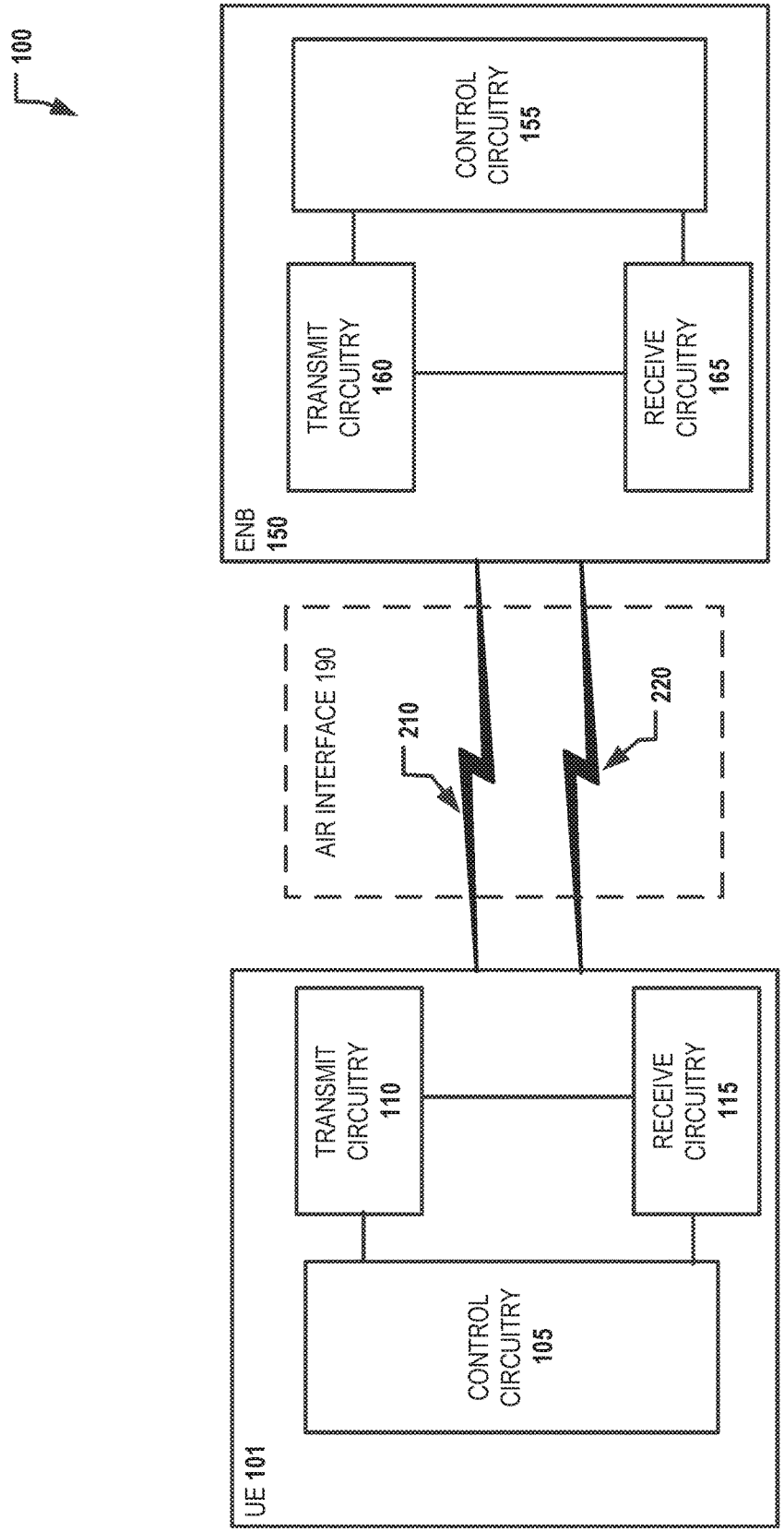
FIG. 1 is a block diagram of a system including an evolved node B (eNB) and user equipment (UE) that may operate according to some embodiments described herein.

Embodiments relate to systems, devices, apparatus, assemblies, methods, and computer readable media to enhance wireless communications, and particularly to communication systems that operate with evolved node B (eNB) systems transmitting to user equipment (UE) using a large number of antennas to generate beams as part of massive MIMO operations using the eNB. The following description and the drawings illustrate specific embodiments to enable those skilled in the art to practice them. Other embodiments can incorporate structural, logical, electrical, process, and other changes. Portions and features of some embodiments can be included in, or substituted for, those of other embodiments, and are intended to cover all available equivalents of the elements described.

FIG. 1A illustrates aspects of a wireless network system 100, in accordance with some embodiments. The wireless network 100 includes a UE 101 and an eNB 150 connected using channels (e.g. channels 210, 220) via an air interface 190. UE 101 and eNB 150 communicate using a system that supports MIMO operation, such that multiple carriers on different beams using the same frequencies may communicate data between eNB 150 and UE 101.

Embodiments described herein for beam interpolation using massive MIMO, can operate within the wireless network 100 using standardize communication systems operating according to third generation partnership project (3GPP) standards such as LTE, LTE-advanced, or other similar or related communication standards for transmitting information. In wireless network 100, the UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The eNB 150 provides the UE 101 network connectivity to a broader network (e.g. network 195 of FIG. 2). This UE 101 connectivity is provided via the air interface 190 in an eNB service area provided by the eNB 150. In some embodiments, such a broader network may be a wide area network operated by a cellular network provider, or may be the Internet. Each eNB service area associated with the eNB 150 is supported by antennas integrated with the eNB 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 150, for example, includes three sectors each covering a 120 degree area with an array of antennas directed to each sector to provide 360 degree coverage around the eNB 150. In other embodiments, different antenna structures may provide different coverage areas.

Massive MIMO systems are a MIMO technology where each eNB is equipped with arrays of active antenna elements. By coherent processing of portions of the signals over the array, transmit precoding can be used in the downlink from the eNB to a UE to focus a signal at the UE. Similarly, receive combining can be used in the uplink to discriminate between signals from different UEs. A particular communication sent using a set of antennas to a particular UE is referred to as sending a communication over a channel on a particular beam, and tracking performance of the beam.

Additionally, in some communications systems, tracking as well as any number of other functions are performed using a reference signal transmitted from the eNB. In a massive MIMO system, each beam (e.g. 10 beams in the 90 element array with 9 elements used for each beam) transmits a reference signal. Because these reference signals are transmitted on shaped beams, they may be referred to as beamformed reference signals. Due to reference limitations and efficient channel usage, the number of transmission beams may be fixed and limited. With a limited number of transmission beams from an eNB and the limits on a fixed array to track a UE, a massive MIMO system may operate with coverage holes between beams. In such coverage hole zones, a UE may receive a signal from one or more beams that is below a threshold for typical allowable operation. While channel state information (CSI) and channel quality indicators (CQI) may be able to identify a primary beam or a beam with the best characteristics in such a hole zone, the actual throughput for the best beam may still be below an acceptable threshold. Some systems for MIMO only allow a channel to be configured on a single beam, and so managing handoff between beams in such a hole zone can result in very low performance. Embodiments herein describe radio resource control (RRC) signaling to enable data for a single channel to be transmitted on multiple beams, thus creating an interpolated communication where data is communicated using two beams which are steered to generate an interpolated transmission beam to a single UE.

In this context, UE 101 and eNB 150 may use various communication processes to transmit data back and forth. The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with wireless communications using carrier aggregation. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to FDM. The transmit circuitry 110 and the receive circuitry 115 may transmit and receive both control data and content data (e.g. messages, images, video, et cetera) structured within data blocks that are carried by the physical channels.

FIG. 1 also illustrates the eNB 150, in accordance with various embodiments. The eNB 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations for managing channels and component carriers used with various UEs. The transmit circuitry 160 and receive circuitry 165 may be adapted to transmit and receive data, respectively, to any UE connected to eNB 150. The transmit circuitry 160 may transmit downlink physical channels comprised of a plurality of downlink subframes. The receive circuitry 165 may receive a plurality of uplink physical channels from various UEs including UE 101. The plurality of uplink physical channels may be multiplexed according to FDM in addition to the use of carrier aggregation.

The communications across air interface 190 may use carrier aggregation, where multiple different component carriers 180, 185 can be aggregated to carry information between UE 101 and eNB 150. Such component carriers may have different bandwidths, and may be used for uplink communications from UE 101 to eNB 150, downlink communications from eNB 150 to UE 101, or both. In MIMO systems, as mentioned above. MIMO information may be sent on channels using the same bandwidth but having a spatial separation. Combinations of different carriers may cover similar areas, or may cover different but overlapping sectors. The radio resource control (RRC) connection between a UE and an eNB manages aspects of a connection between the UE and the eNB via various signaling discussed below to determine which carriers should be used. CSI and CQI communications, for example, determine which channels may provide the best performance among the available channels.

Figure 2:
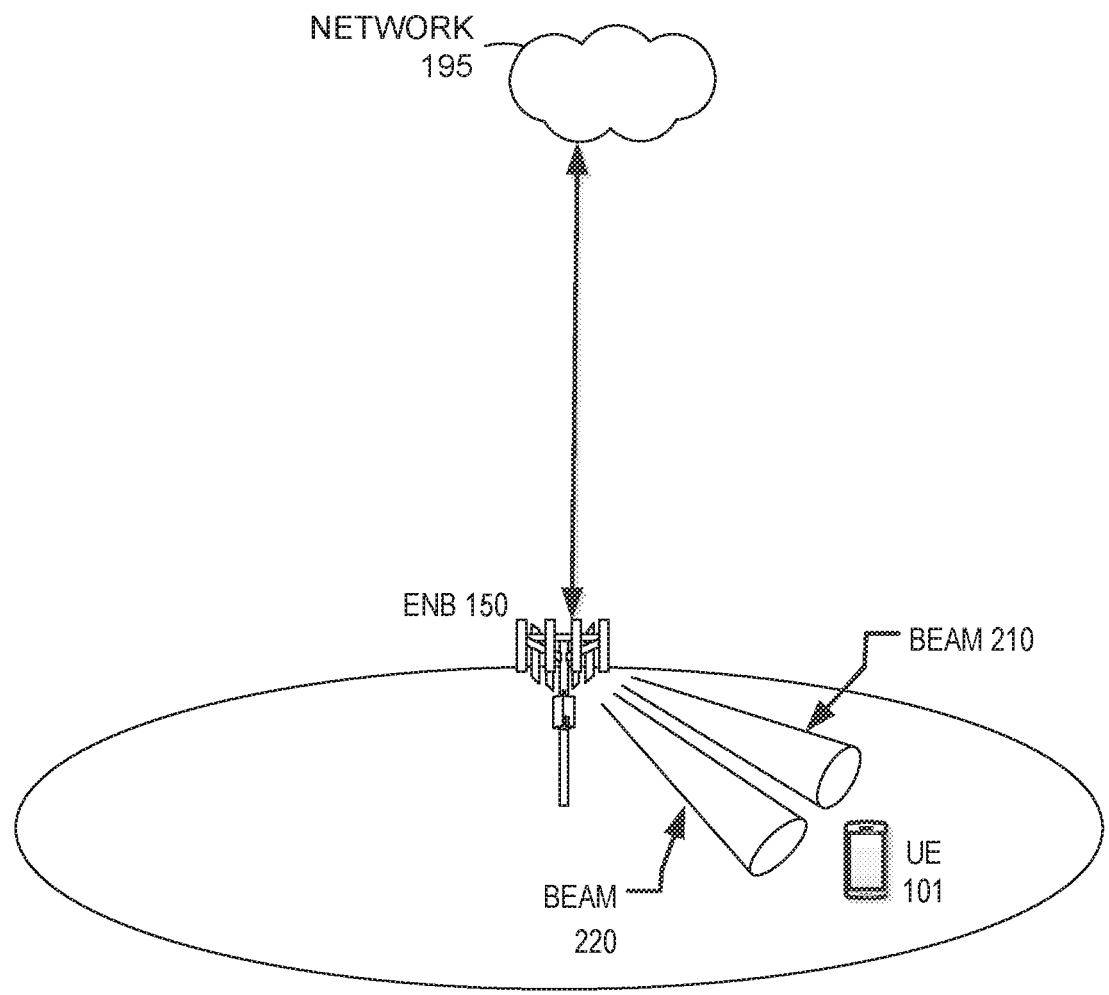
FIG. 2 is a diagram showing additional aspects of a system using MIMO for communications according to some embodiments described herein.

FIG. 2 then describes additional aspects of the operation of certain embodiments. In FIG. 2, eNB 150 is illustrated as having an array of antennas on a tower, with multiple shaped beams 210 and 220 available to transmit data to UE 101. As mentioned above, each beam 210, 220 will transmit a beamformed reference signal that can be used by UE 101 to facilitate the connection between UE 101 and eNB 150. Each beam may be shaped to track UE 101 through a certain cell area.

If, for example, a particular cNB has an array of 90 antennas, with 9 antennas used for each beam, the eNB can use the 90 antennas to generate 10 beams. Depending on the system configuration, one or more of the beams may be used to send communications to a particular UE. Each beam may have one or more transmission angles, as well as an angular volume or a set of allowable ranges for the transmission angles. For example, beam 210 may be associated with a horizontal angle, which allows the antennas on a tower to track UE 101 as it moves across a coverage area horizontally (e.g. around the circle of the coverage area for eNB 150). The single beam 210 may also be associated with a vertical angle that changes as a height of the UE 101 or a distance of UE 101 from the eNB 150 changes. For a fixed set of antennas that generate the single beam, this range will be limited. In other words, if UE 101 moves in a complete circle around the tower of eNB 150, beam 210 generated by a particular set of antenna elements cannot track the UE the entire way. Instead, the UE is passed to different beams or channels when the UE moves outside the area of coverage for a beam.

TABLE 1

| City Scenario 1 | 5% throughput [Mbps] | | 50% throughput [Mbps] | |
|---|---|---|---|---|
| without beam interpolation | 0 | 100.00% | 63.7068 | 100.00% |
| with beam interpolation | 0.0352 | 103.52% | 68.0308 | 106.79% |
| City Scenario 1 | 95% throughput [Mbps] | | Avg throughput [Mbps] | |
| without beam interpolation | 288.537 | 100.00% | 109.505734 | 100.00% |
| with beam interpolation | 286.907 | 99.44% | 109.212322 | 99.73% |

Table 1 includes system data for a physical implementation of massive MIMO beam interpolation using two beams where each beam is generated using a fixed and unmoving set of antenna elements. In city scenario 1, a UE is tested in three zones. Each zone is associated with a percentage of peak throughput, shown as 5%, 50%, and 95%. The first is a 5% throughput hole zone where there is 0 successful data transmission on a single primary beam. Using beam interpolations with information sent using two transmission beams, improved performance is seen. Similarly, in the scenario 1 with 50% throughput, where a single beam is roughly at half of the expected performance, a significant improvement is seen. In the position with 95% of expected throughput from a single beam, a slight performance degradation is seen. Embodiments described herein may thus provide improved performance in areas where a single beam is at the limits of its ability to provide throughput at the cost of a small performance decrease in other areas. The performance decrease may be mitigated in some embodiments by efficient transitions between single beam transmissions and interpolated beam transmission.

Figure 3:
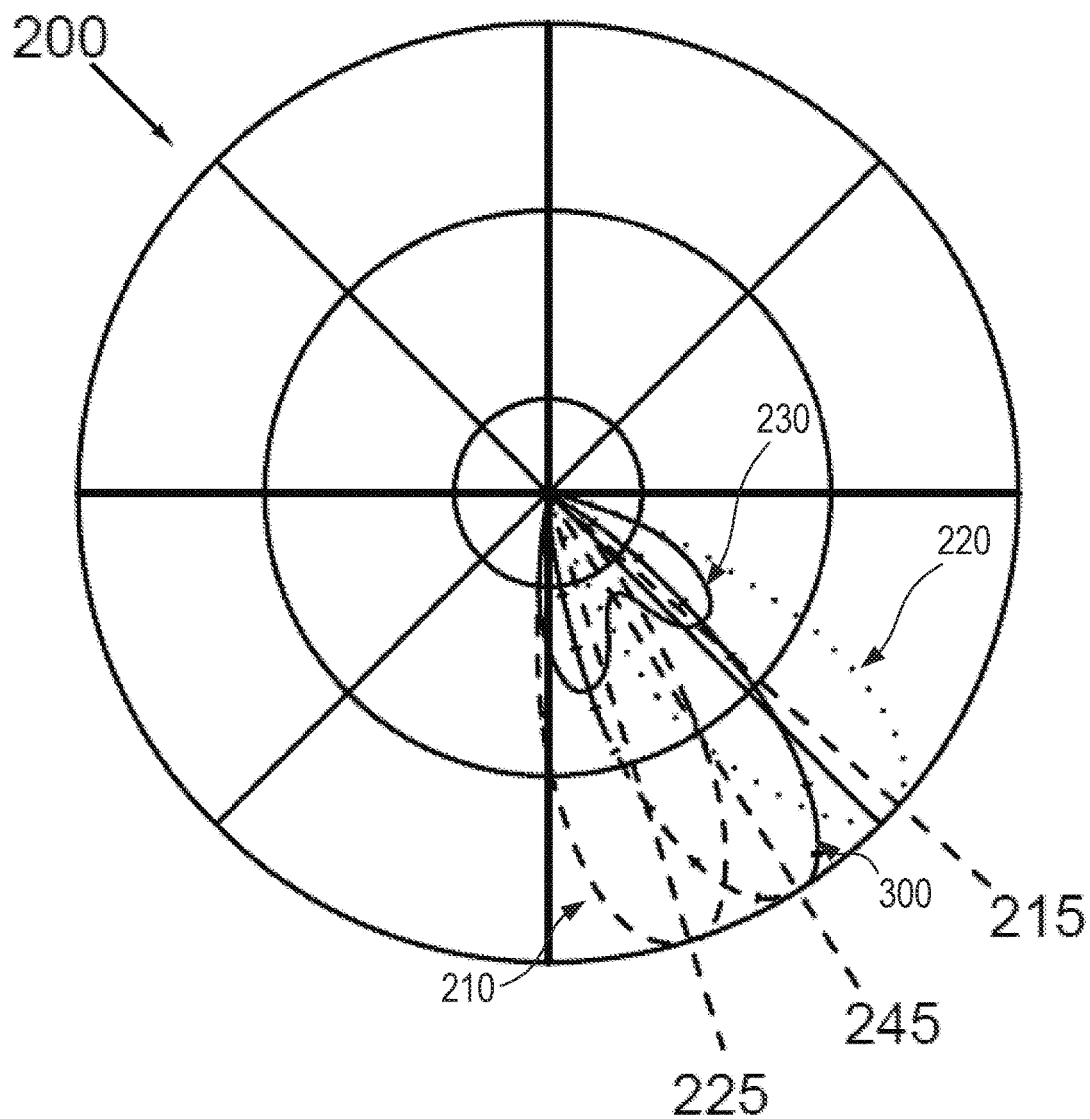
FIG. 3 illustrates aspects of beam interpolation according to various embodiments described herein.

FIG. 3 then illustrates aspects of beam interpolation according to some embodiments. For simplicity, FIG. 3 may be considered a simplified top-down view of an eNB such as eNB 150. FIG. 3 illustrates the beams 210 and 220 as coming from a single origin point, whereas physically the antenna arrays that generate beam 210 and 220 are physically separate, but this simplification may be made in some embodiments for the purposes of processing efficiency to estimate the interpolated beam without compensating for the physical separation between the origination points of the separate beams 210, 220.

Embodiments described herein may use both angle based beam interpolation and power based beam interpolation. For simplification of the descriptions herein, only the horizontal angle 225 of beam 220 and the horizontal angle 215 of beam 220 used to generate angle based interpolated beam 230 and power based interpolated beam 240 at horizontal angle 245 are discussed. In various embodiments, both horizontal and vertical angles may be used. In the system 200, a UE such as UE 101 is physically located along the vector associated with angle 245, and beams 220 and 210 are set at corresponding angles 225 and 215 to generated an interpolated beam at angle 245 that will track the UE. As the UE moves, the angles 225, 215, and 245 will change to track the UE. System 200 is thus a snapshot of beam 210 and beam 220 at a particular time as angle based interpolated beam 230 or power based interpolated beam 240 are created.

For the angle based beam interpolation, the interpolated beam angle may be generated as follows.

$$\theta = \alpha\theta_1 + (1-\alpha)\theta_2$$

$$\varphi = \beta\varphi_1 + (1-\beta)\varphi_2$$

where $\theta$ indicates the interpolated horizontal angle (e.g. $\theta$ refers to angle 245); $\theta_j$ refers to the horizontal angle of beam j (e.g. $\theta_1$ refers to angle 215 and $\theta_2$ refers to angle 225), $\alpha$ and $\beta$ are the interpolation factor in the range [0, 1].

An eNB such as eNB 150 can schedule a best transmission beam 210 and a surrounding transmission beam 220 within a Channel State Information (CSI) process. The Antenna Ports (APs) (e.g. the fixed address ports for each antenna out of all of the antennas of the eNB) transmitting the best beam for a CSI Reference Signal (CSI-RS) group may be explicitly configured via Radio Resource Control (RRC) signaling. Examples of CSI processes and RRC signaling are described in various 3GPP releases such as 3GPP release 12 of Mar. 6, 213 (SP-67). The CSI processes thus measure the performance of channels on particular beams using the beamformed reference signals transmitted by those beams. In certain embodiments described herein, RRC signaling may be used to select multiple beams for transmission of data from the eNB to the UE when quality thresholds are within certain parameters.

Different structures for the CSI processes may be used in different embodiments. For example, in some embodiments, each beam may have separate CSI processes, and the eNB may configure a transmission beam index for each CSI-RS group in a CSI process by RRC signaling. In other embodiments, the UE may report an Angle based Beam interpolation Indicator (ABI) associated with CSI. This ABI may be used is used to indicate $\alpha$ and $\beta$ from (1) above.

TABLE 2

| ABI | α | β |
| --- | --- | --- |
| 0 | 1 | 1 |
| 1 | 0.67 | 0.67 |
| 2 | 0.5 | 0.5 |
| 3 | 0.33 | 0.33 |

An example for a 2-bit ABI may be as Table 2. The Channel Quality Indicator (CQI) may be reported by the UE to the eNB based on the best transmission beam. The UE may also feedback a Beam Index (BI) indicating which beam is to be used as the secondary transmission beam for interpolation. The best transmission beam may be considered as the first transmission beam for interpolation.

In some embodiments, a UE may have more than one strong channel cluster, or multiple options with strong beams. In such embodiments, by the power based interpolated beam, the rank of the precoder may be increased. In such embodiments, the interpolated transmission beam may be generated as follow.

$$P = \sqrt{\gamma}P_1 + (1-\sqrt{\gamma})P_2 \qquad (2)$$

where P is the interpolated transmission beam (e.g. power based interpolated beam 240); Pj is the weight of transmission beam j (e.g. P1 is the weight of beam 210 and P2 the weight of beam 220); and $\gamma$ is the interpolation factor in the range [0, 1].

In various embodiments, the beams for use with interpolation may be selected in different ways. For example, in some embodiments, 10 beams may be available, with one beam identified as the strongest or primary beam, and three of the nine remaining beams available to be used as a secondary beam for the interpolation. In some embodiments, the secondary beam and the best transmission beam may be measured within a CSI process. The initial best transmission beam may be selected as P1, and the secondary transmission beam P2 within a CSI process may be indicated by the RRC signaling. Alternatively the P1 and P2 may be transmitted in fixed Antenna Ports (APs), for example, in a system with 60 APs with index numbers 1-60, the APs 15 and 16 may be used to transmit P and APs 17 and 18 may be used to transmit P2. In other words, the RRC signaling may identify the antennas for a particular beam by APs rather than by a fixed beam or channel grouping established in the system. In other embodiments fixed groupings of antennas referred to by a beam or channel index may be established identifying which antennas are used for beams. Either such identifiers may be used to identify two groups of antennas associated with a first and second beam are used to generate an interpolated beam. As discussed above, since each beam is structured to transmit a beamformed reference signal, the system does not simply reconfigure the antennas associated with a beam, as this would create issues with the beamformed reference signals. Using two beams to generate an interpolated beam maintains the channels and beams for the beamformed reference signals while providing coverage in hole zones as discussed above.

In some embodiments, the Power based Beam interpolation Indicator (PBI) γ may be reported and quantized in N bits. For instance, 1 bit PBI may be used, where the value 0 means γ=1 and value 1 means γ=0.5. This PBI may be reported associated with CSI. This simplification enables a simple CSI communication identifying whether beam interpolation is used or not, and enabling different embodiments to provide differing levels of interpolation configurations in different embodiments. For link adaptation, the UE may construct the effective channels based on different type of PBI. Then the UE may report the PBI with the highest Spectrum Efficiency (SE) as well as the CSI measured under this PBI.

Figure 4:
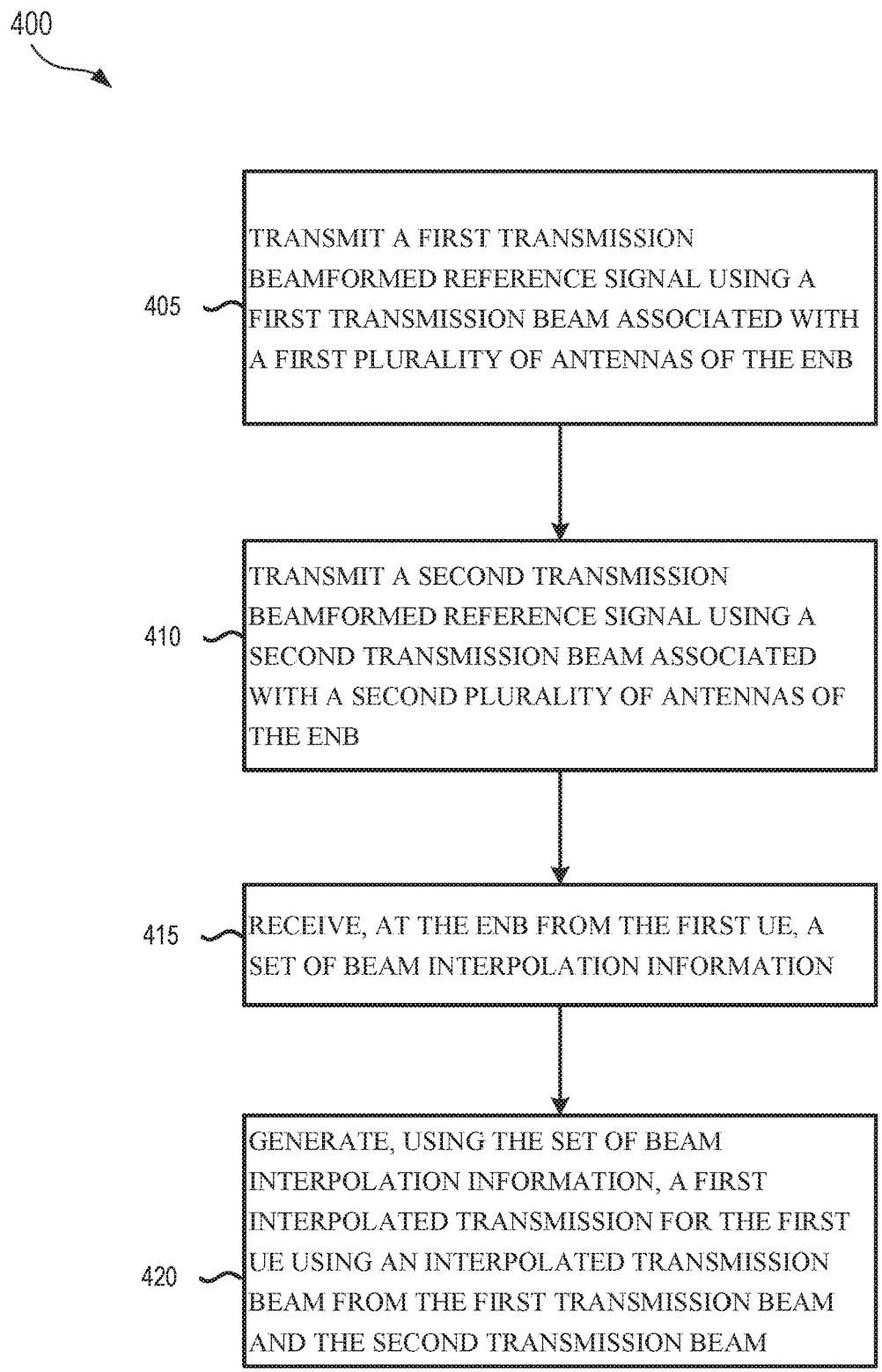
FIG. 4 describes a method for beam interpolation in massive MIMO systems according to some example embodiments.

FIG. 4 then describes a method 400 that is performed by an eNB such as eNB 150 to transmit data to a UE using beamforming with massive MIMO elements of the eNB. In some embodiments, such a method may be performed by one or more apparatus elements of the eNB, such as baseband circuitry of the eNB or various circuitry elements of the eNB working in combination. In other embodiments, instructions stored in a memory element may comprise instructions that one or more processors of the eNB may use to perform method 400.

As described above, multiple beams in a massive MIMO system are transmitted from an eNB, and method 400 begins with operation 405, where the eNB transmits a first transmission beamformed reference signal using a first transmission beam associated with a first plurality of antennas of the eNB and operation 410 where the eNB transmits a second transmission beamformed reference signal using a second transmission beam associated with a second plurality of antennas of the eNB. The reference signals may be transmitted simultaneously, or within a certain period of time. The first and second channels may transmit the associated beamformed references signal using a set periodic transmission subframes in a physical resource block configuration to convey the beamformed reference signals. The UE may then operate to identify information about the beams in a number of ways. In some embodiments, the eNB may initiate a CSI process for the UE, or the UE may initiate access to establish a connection with the eNB using RRC signaling. Such signaling may also indicate the availability and support for interpolated beams by the UE and/or by the eNB.

The eNB then receives set of beam interpolation information from the UE in operation 415. This beam interpolation information may simply be quality information describing the beamformed reference signals as they were received at the UE. For example, CQI data may be some or all of the beam interpolation information. In some embodiments, the beam interpolation information may include a specific request for an interpolated beam based on threshold analysis of the beamformed reference signals as well as an analysis of other signals including beamformed reference signals from other beams besides the first and second transmission beams. In still further embodiments, calculated values based on channel quality measurements from multiple channels such as ABI or PBI interpolation factors may be part of the beam interpolation data.

The enB then uses the set of beam interpolation data in operation 420 to generate a first interpolated transmission for the first UE using an interpolated transmission beam from the first transmission beam and the second transmission beam. During transmission of the beam interpolation data (e.g. media or network data from an application server or any other such source in an example network 195), the interpolated beam may be tracked as if it was a standard beam, and the power and angle for the first and second transmission beams may be adjusted to track movement of the UE for subsequent transmissions, or to determine that additional data should not use an interpolated beam. For example, UE may transition to receiving data from the interpolated beam in operation 520, to receiving data only from the first transmission beam based on subsequent CSI measurements of associated with the first and second transmission beams, along with associated RRC signaling to adjust the connection between the UE and the eNB.

Figure 5:
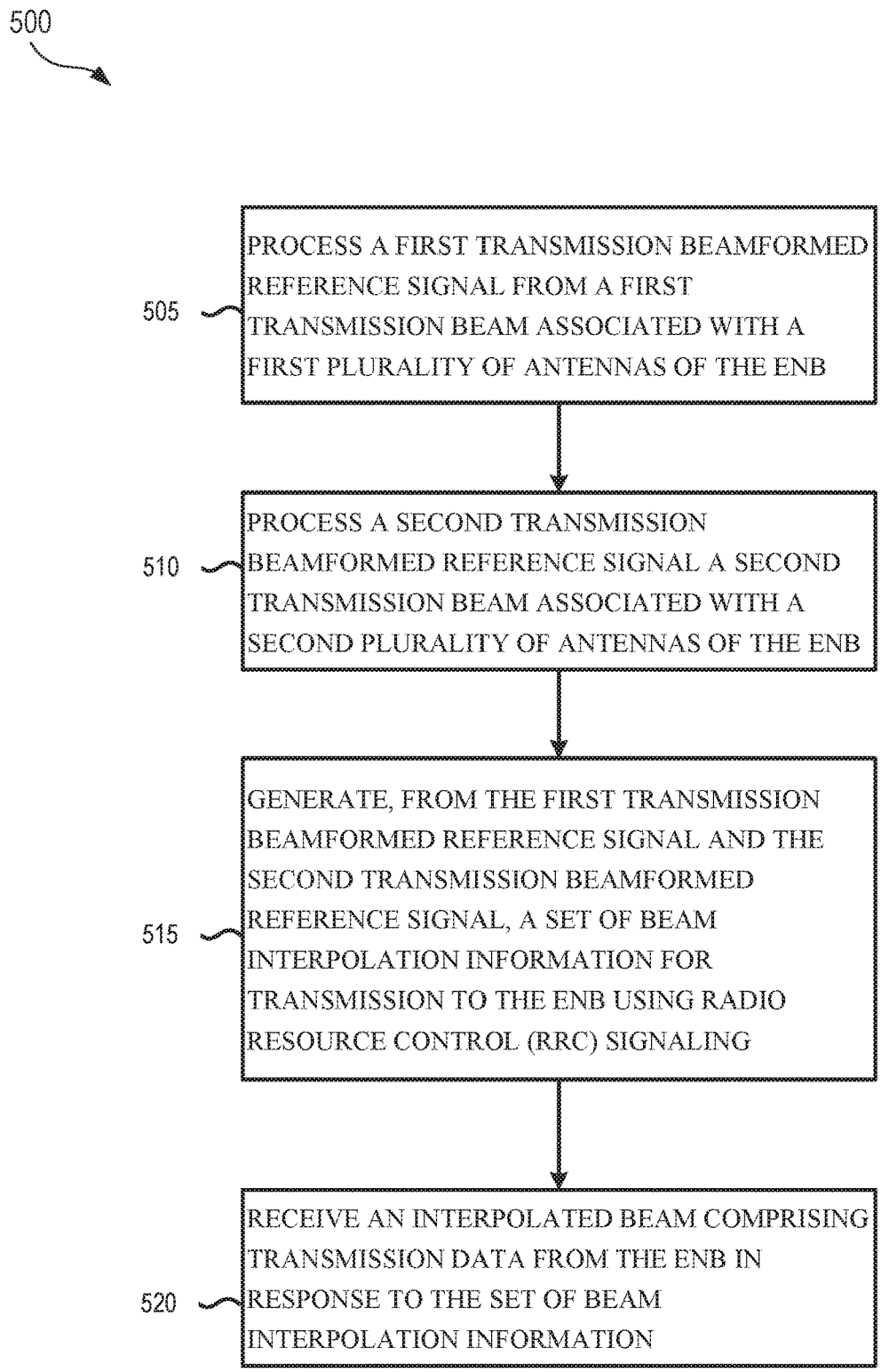
FIG. 5 describes a method for beam interpolation in massive MIMO systems according to some example embodiments.

FIG. 5 then describes a corresponding method that may be performed by a UE in some embodiments. Method 500 may be performed by baseband circuitry of the UE, or by any combination of circuit elements, assemblies, or any apparatus of the UE. In some embodiments, instructions stored in a memory of the UE may configure the UE to perform method 500 when the instructions are executed by one or more processors of the UE.

Method 500 begins with the UE receiving and processing a first transmission beamformed reference signal from a first transmission beam associated with a first plurality of antennas of the eNB in operation 505 and receiving and processing a second transmission beamformed reference signal a second transmission beam associated with a second plurality of antennas of the eNB in operation 510. These may correspond, for example, to operations 405 and 410 of method 400 performed by the eNB. In operation 415, the UE then generates, from the first transmission beamformed reference signal and the second transmission beamformed reference signal, a set of beam interpolation information for transmission to the eNB using Radio Resource Control (RRC) signaling. The set of beam interpolation information may additionally be based on other information received at the UE from the eNB, such as particular signaling to initiate CSI processes for any beams measurable at the UE, or other such signaling from the eNB to the UE. The beam interpolation information is then sent to the eNB from the UE. The transmission of the beam interpolation information may, in some embodiments, involve separate information for each beam communicated to the eNB separately, or it may involve one or more transmissions to the eNB with information about any number of beams at one time.

Various embodiments may manage the signaling between the eNB and the UE in different ways. In some embodiments, both ABI and PBI may be reported together from the UE to the eNB, and the two type of beams to be interpolated may be explicitly configured via RRC signaling or fixed in constant APs as mentioned above. In some embodiments, an ABI or PBI may be reported independently. In other embodiments, the UE reports measurement data, and the ABI and/or PBI are determined by the eNB. In some embodiments, one CSI process may be configured to report ABI or PBI via RRC signaling, separate from other CSI operations for the beams. Further, in some embodiments, Beam Index (BI) values for the beams making up the interpolated transmission beam (or beams) may be reported in associated with CSI processes.

In another embodiment, eNB errors occur. Hence the indication of whether the beam interpolation for current scheduled CSI process is enabled may be added in the Downlink Control Information (DCI) that is part of standardized signaling between the eNB and the UE (e.g. according to 3GPP LTE, LTE-advanced, or other similar standards). The ABI and PBI may be configured by this indicator in DCI together or independently. In one embodiments the ABI and PBI are configured together, as a 1-bit indicator, where value 0 means the both interpolations are disabled in this CSI process and a value 1 means the both interpolations are enabled. In such embodiments, the eNB and the UE are configured to identify the indicator that allows the eNB and the UE to communicate regarding beam interpolation in order to allow beams having separate beamformed reference signals to jointly create the interpolated beam and transmit data on the single channel used with the interpolated beam. In other embodiments, other indicators having more than one bit may be used to identify additional details regarding the interpolated beam configuration.

In one example embodiment where the ABI and PBI are configured independently, two indicators may be used, one is the 1-bit ABI enable indicator and the other is the 1-bit PBI enable indicator. In other embodiments, other indicators having additional bits may be used.

In another embodiment, the eNB (and UE) may decide the ABI or PBI based CSI reporting type according to the reported Beamformed Reference Signal Receiving Power (BRS-RP) or Reference Signal Receiving Power (RSRP). In some embodiments, when the RSRP is higher than a threshold A, the PBI may be applied, and when the RSRP is lower than a threshold B, the ABI may be applied, where the threshold A may be no less than threshold B. The threshold A and threshold B may be configured via RRC signaling in such embodiments.

In another embodiment, the UE may not report the API or PBI. Instead the eNB may schedule one CSI process set, which contains two CSI processes. The two CSI processes are indicating the same CSI-RS APs. Thus the transmission beams for the two CSI processes may be the same. In other embodiments, other groupings of CSI processes may be used. When a CSI processes occurs, a UE may report a Beam Selector Indicator (BSI) for each CSI process. In some such embodiments if the two BSIs are reported as different to the eNB, the eNB may process the angle based beam interpolation or power based beam interpolation by scheduler according to the reported CSIs for the two CSI processes. The transmission beams to be interpolated may be indicated by the two BSIs and the interpolation factor may be decided by Channel Quality Indicators (CQIs) in the two CSI processes. Some embodiments may thus may thus require the BSIs of different CSI processes to be different for the sake of beam interpolation operations. In such embodiments, the first BSI may indicate the best transmission beam and the second BSI may indicate the second best transmission beam. Then a 1-bit flag may be added to the CSI process set configuration in RRC signaling, where value 0 may indicate the reported BSIs could be the same and value 1 may indicate the reported BSIs shall be different. Alternatively this 1-bit flag may be added into DCI.

In various other embodiments, other combinations of operations and signals may be used, each having corresponding execution at the eNB and the UE. Further, an eNB with a massive MIMO function may manage communications to multiple UEs at the same time. In any embodiment, different combinations of operations may be used at the same time, such that the eNB may use beam interpolation data from different UEs to determine how to allocate the beams of the eNB to the different UEs. As part of such allocation, the eNB may transmit data on multiple interpolated beams to different UEs at the same time, and the eNB may determine to begin transmission using an interpolated beam to a first UE based on the demands or lack of demand for data by a second UE.

EXAMPLES

In various embodiments, methods, apparatus, non-transitory media, computer program products, or other implementations may be presented as example embodiments in accordance with the descriptions provided above. Certain embodiments may include UE such as phones, tablets, mobile computers, or other such devices. Some embodiments may be integrated circuit components of such devices, such as circuits implementing baseband or radio frequency processing on an integrated circuitry. In some embodiments, functionality may be on a single chip or multiple chips in an apparatus. Some such embodiments may further include transmit and receive circuitry on integrated or separate circuits, with antennas that are similarly integrated or separate structures of a device. Any such components or circuit elements may similarly apply to evolved node B embodiments described herein. Additionally, every example described below is associated with corresponding operations of either an eNB or a UE, depending on the device described as part of the example.

Example 1 is a computer readable medium comprising instructions that, when executed by one or more processors, configure an evolved node B (enB) to transmit to one or more user equipment (UEs) via a massive multiple-input multiple-output (MIMO) system of the eNB, the eNB configured to: transmit a first transmission beamformed reference signal using a first transmission beam associated with a first plurality of antennas of the eNB; transmit a second transmission beamformed reference signal using a second transmission beam associated with a second plurality of antennas of the eNB; receive, at the eNB from the first UE, a set of beam interpolation information; and generate, using the set of beam interpolation information, a first interpolated transmission for the first UE using an interpolated transmission beam from the first transmission beam and the second transmission beam.

In Example 2, the subject matter of Example 1 optionally includes wherein the instructions further configure the eNB to establish a radio resource control (RRC) connection for the interpolated transmission beam comprising the first transmission beam and the second transmission beam using RRC signaling, wherein the RRC signaling comprises the receipt of the set of beam interpolation information at the eNB.

In Example 3, the subject matter of any one or more of Examples 1-2 optionally include-2 wherein the instructions further configure the eNB to initiate a channel state information (CSI) process with the first UE prior to receipt of the set of beam interpolation information; wherein the set of beam interpolation information comprises a Channel Quality Indicator (CQI) for the first transmission beam, a first transmission beam Index (BI) value for the first transmission beam, and a second BI value for the second transmission beam.

In Example 4, the subject matter of any one or more of Examples 1-3 optionally include-3 wherein the set of beam interpolation information comprises Angle based Beam interpolation Indicator (ABI) data associated with interpolation factors α and β using equation (1) above, wherein θ is a horizontal angle of the interpolated transmission beam used to transmit the first interpolated transmission; wherein θ1 is a horizontal angle of the first transmission beam;

wherein θ1 is a horizontal angle of the second transmission beam; wherein φ is a vertical angle of the interpolation transmission beam used to transmit the first interpolated transmission; wherein φ1 is a vertical angle of the first transmission beam; and wherein φ2 is a vertical angle of the second transmission beam.

In Example 5, the subject matter of Example 4 optionally includes wherein the ABI data consists of a two-bit value associated with an ABI table stored in the eNB.

In Example 6, the subject matter of any one or more of Examples 1-5 optionally include-5 wherein the set of beam interpolation information comprises Power based Beam interpolation Indicator (PBI) data associated with power interpolation factor γ; using equation 2 above, wherein P is the interpolated transmission beam used to transmit the first interpolated transmission; wherein P1 is the first transmission beam; and wherein P2 is the second transmission beam.

In Example 7, the subject matter of Example undefined optionally includes wherein the PBI data comprises an N bit value associated with a corresponding power interpolation factor γ value by the eNB.

In Example 8, the subject matter of Example 7 optionally includes wherein the N bit value is 1 and the corresponding power interpolation factor γ value is 0.5.

In Example 9, the subject matter of any one or more of Examples 4-8 optionally include-8 wherein the set of beam interpolation information is received at the eNB from the first UE as a first RRC transmission comprising the ABI data and the PBI data.

In Example 10, the subject matter of any one or more of Examples 4-9 optionally include-8 wherein the set of beam interpolation information is received at the eNB from the first UE as a plurality of RRC transmissions, wherein a first RRC transmission of the plurality of RRC transmissions comprises the ABI data and wherein a second RRC transmission of the plurality of RRC transmissions comprises the PBI data.

In Example 11, the subject matter of any one or more of Examples 1-10 optionally include-11 wherein the set of beam interpolation information is used to determine antenna port (AP) identification data for antennas associated with the first channel and second explicit AP identification data for antennas associated with the second channel.

In Example 12, the subject matter of any one or more of Examples 1-11 optionally include-11 wherein the set of beam interpolation information comprises a fixed identifier associated with the interpolated transmission beam.

In Example 13, the subject matter of any one or more of Examples 1-12 optionally include-12 wherein the instructions further configure the eNB to transmit a beam interpolation enable indicator as Downlink Control Information (DCI) to the first UE prior to transmission of the first interpolated transmission.

In Example 14, the subject matter of Example 14 optionally includes wherein the instructions further configure the eNB to track errors associated with the interpolated transmission channel, and to transmit a beam interpolation disabled indicator to the first UE as second DCI when an error rate associated with the interpolated transmission channel exceeds a threshold error rate.

In Example 15, the subject matter of any one or more of Examples 1-14 optionally include wherein the set of beam interpolation information is selected based on a CSI reporting type determined by comparing a Beamformed Reference Signal Receiving Power (BRS-RP) with a reporting type threshold value.

In Example 16, the subject matter of any one or more of Examples 1-15 optionally include wherein the set of beam interpolation information is selected based on a CSI reporting type determined by comparing a Reference Signal Receiving Power (RSRP) with a first threshold value and a second threshold value, such that when the RSRP is above the first threshold, the set of beam interpolation information is associated with power based beam interpolation (PBI); and when the RSRP is below the second threshold, the set of beam interpolation information is associated with angle based beam interpolation (ABI), wherein the first threshold is no less than the second threshold, and wherein the first threshold and the second threshold are configurable via RRC signaling.

In Example 17, the subject matter of any one or more of Examples 1-16 optionally include wherein the instructions configure the eNB to: schedule a CSI process set comprising a first CSI process and a second CSI process, wherein each CSI process of the CSI process set reports a beam selection indicator (BSI), wherein each CSI process is associated with a corresponding Channel Quality Indicator (CQI); determine that a first BSI of the first CSI process is different than a second BSI of the second CSI process; and initiate establishment of the interpolated transmission beam using radio resource control (RRC) signaling in response to the determination that the first BSI is different than the second BSI.

Example 18 is an apparatus of an evolved node B (eNB) for interpolated beam transmission using massive multiple-input multiple-output (MIMO), the apparatus comprising baseband circuitry configured to: generate a first transmission beamformed reference signal for transmission on a first transmission beam using a first plurality of antennas of a massive MIMO antenna array of the eNB; generate a second transmission beamformed reference signal for transmission on a second transmission beam using a second plurality of antennas of the massive MIMO antenna array of the eNB; access a set of beam interpolation information from a first UE; and generate, based on the set of beam interpolation information, a first interpolated transmission using the first transmission beam and the second transmission beam.

In Example 19, the subject matter of Example 18 optionally includes further comprising: radio frequency (RF) circuitry configured to: receive the set of beam interpolation from the first UE via an air interface; and transmit the first interpolated transmission via the air interface using the first plurality of antennas and the second plurality of antennas.

In Example 20, the subject matter of any one or more of Examples 18-19 optionally include wherein the baseband circuitry is further configured to determine that the first UE is in a coverage hole between the first transmission beam and the second transmission beam based on comparison of a first Beamformed Reference Signal Receiving Power (BRS-RP) measured from the first transmission beamformed reference signal with a first threshold value and a second BRS-RB measured from the second transmission beamformed reference signal with the first threshold value.

Example 21 is an apparatus of an eNB for interpolated beam transmission using massive multiple-input multiple-output (MIMO), the apparatus comprising: means for generating a first transmission beam, the first transmission beam having a first limited transmission angle; means for generating a second transmission beam, the second transmission beam having a second limited transmission angle, wherein only a portion of the first limited transmission angle overlaps with the second limited transmission angle; receive circuitry configured to receive beam interpolation information from a first UE, wherein the beam interpolation information is associated with the first transmission beam and the second transmission beam; and means for generating a first interpolated transmission based on the beam interpolation information using the first transmission beam and the second transmission beam.

In Example 22, the subject matter of Example 21 optionally includes further comprising: means for initiating generation of the first interpolated transmission using the beam interpolation information as generated by Channel State Information (CSI) processes set comprising a plurality of CSI processes between the eNB and the first UE.

In Example 23, the subject matter of Example 22 optionally includes wherein the CSI process set comprises a 1-bit radio resource control (RRC) signaling flag.

In Example 24, the subject matter of any one or more of Examples 21-23 optionally include further comprising: means for determining that the first UE is in a coverage hole between the first transmission beam and the second transmission beam.

Example 25 is a computer readable medium comprising instructions that, when executed by one or more processors, configure a user equipment (UEs) to receive communications from an evolved node B (enB) via a massive multiple-input multiple-output (MIMO) system of the eNB, the UE configured to: measure a first transmission beamformed reference signal on a first transmission beam associated with a first plurality of antennas of the eNB; measure a second transmission beamformed reference signal a second transmission beam associated with a second plurality of antennas of the eNB; generate, from the first transmission beamformed reference signal and the second transmission beamformed reference signal, a set of beam interpolation information; and receive, at the UE from the eNB, a downlink transmission using an interpolated beam generated from the first transmission beam and the second transmission beam.

In Example 26, the subject matter of Example 25 optionally includes wherein the set of beam interpolation information further comprises Angle based Beam interpolation Indicator (ABI) data associated with interpolation factors $\alpha$ and $\beta$; wherein: wherein $\theta$ is a horizontal angle of the interpolated transmission beam used to transmit the first interpolated transmission; wherein $\theta 1$ is a horizontal angle of the first transmission beam: wherein $\theta 1$ is a horizontal angle of the second transmission beam; wherein $\varphi$ is a vertical angle of the interpolation transmission beam used to transmit the first interpolated transmission; wherein $\varphi 1$ is a vertical angle of the first transmission beam; and wherein $\varphi 2$ is a vertical angle of the second transmission beam.

Example 27 is an apparatus of a user equipment (UE) for reception of transmissions from an evolved node B (enB) using massive multiple-input multiple-output (MIMO) operations, the apparatus comprising: baseband circuitry configured to: process a first transmission beamformed reference signal from a first transmission beam associated with a first plurality of antennas of the eNB; process a second transmission beamformed reference signal a second transmission beam associated with a second plurality of antennas of the eNB; and generate, from the first transmission beamformed reference signal and the second transmission beamformed reference signal, a set of beam interpolation information for transmission to the eNB using Radio Resource Control (RRC) signaling.

In Example 28, the subject matter of Example 27 optionally includes further comprising: one or more antennas; radio frequency (RF) circuitry coupled to the one or more antennas and the baseband circuitry, the RF circuitry configured to: receive the first transmission beamformed reference signal and the second transmission beamformed references signal; transmit the set of beam interpolation information to the eNB; and receive a set of application data on an interpolated beam.

In Example 29, the subject matter of any one or more of Examples 27-28 optionally include wherein the baseband circuitry is further configured to establish an active RRC connection via the interpolated beam using the first transmission beam and the second transmission beam based on the RRC signaling.

In Example 30, the subject matter of any one or more of Examples 24-29 optionally include wherein the set of beam interpolation information comprises Power based Beam interpolation Indicator (PBI) data associated with power interpolation factor $\gamma$; wherein: wherein P is the interpolated transmission beam used to transmit the first interpolated transmission; wherein P1 is the first transmission beam; and wherein P2 is the second transmission beam.

Example 31 may include a system configures multiple downlink Transmission (Tx) beams as well as beam interpolation.

Example 32 may include the method of example 31 or some other example herein, an angle based beam interpolator may be reported within a Channel State Information (CSI) process.

Example 33 may include the method of example 32 or some other example herein, the CSI process may contain more than one correlated Tx beams and two beam selectors may be reported, and the beam selector may indicate the selected beams within the Tx beams in the CSI process.

Example 34 may include the method of example 31 or some other example herein, 1 bit flag may be used in CSI process configuration in RRC, where value 1 may mean this CSI process requires angle based beam interpolator and two beam selectors feedback and value 0 may mean the angle based beam interpolator are not used and one beam selector may be reported.

Example 35 may include the method of example 31 or some other example herein, a power based beam interpolator may be reported within a CSI process.

Example 36 may include the method of example 35 or some other example herein, the eNB may configure the CSI process containing more than one uncorrelated Tx beams.

Example 37 may include the method of example 35 or some other example herein, two beam selectors may be reported associated with the CSI.

Example 38 may include the method of example 35 or some other example herein, the reported CSI are measured in the power based interpolated Tx beams.

Example 39 may include the method of example 35 or some other example herein, 1 bit flag may be used in the CSI processing configuration in RRC, where value 1 means the power based beam interpolation is enabled and value 0 means the power based beam interpolation is disabled.

Example 40 may include the method of example 31 or some other example herein, the angle based beam interpolation and power based beam interpolation may be enabled simultaneously in a CSI process.

Example 41 may include the method of example 40 or some other example herein, a Reference Signal Receiving Power (RSRP) threshold may be used to enable the angle based beam interpolation, which may be configured via RRC signaling. If the RSRP is lower than the threshold, the angle based beam interpolation may be enabled.

Example 42 may include the method of example 40 or some other example herein, an RSRP threshold may be used to enable the power based beam interpolation, which may be configured via RRC signaling. If the RSRP is higher than the threshold, the power based beam interpolation may be enabled.

Example 43 may include the method of example 31 or some other example herein, the UE may be configured to measure a CSI processes set containing two CSI processes, and 1-bit flag may be added in the CSI process set configuration in RRC signaling, where value 1 means the UE may report two different beam selectors for the two CSI processes and value 0 means there is no restriction on the reported two beam selectors.

Example 44 may include the method of example 43 or some other example herein, the two reported CSIs may be measured according to the two Tx beams indicated by the two beam selectors.

Example 45 may include the method of example 43 or some other example herein, the eNB may generate the new Tx beam for the UE with the corresponding beam interpolation method and factor according to the reported CSI.

Example 46 may include a method comprising: identifying, by an evolved NodeB (eNB), two or more transmission (Tx) beams; and generating, by the eNB, one or more additional Tx beams based on angle-based beam interpolation or power-based beam interpolation.

Example 47 may include the method of example 46 or some other example herein, wherein the angle-based beam interpolation is based on an indication of an angle based beam interpolator that is reported within a channel state information (CSI) process.

Example 48 may include the method of example 47 or some other example herein, wherein the CSI process may related to more than one correlated Tx beam, and two beam selectors may be reported in the CSI process, and a beam selector may indicate a selected beam with the Tx beams of the CSI process, and the angle-based beam interpolation may be based on the selected beam(s).

Example 49 may include the method of example 46 or some other example herein, wherein the angle-based beam interpolation is based on a 1 bit flag that is used in a CSI process configuration in radio resource control (RRC), wherein a first value of the flag indicates this CSI process requires angle based beam interpolator and two beam selectors feedback and another value of the flag indicates the angle based beam interpolator are not used and one beam selector may be reported.

Example 50 may include the method of example 46 or some other example herein, wherein the power-based beam interpolation is based on an indication of a power based beam interpolator that is reported within a channel state information (CSI) process.

Example 51 may include the method of example 50 or some other example herein, further comprising configuring, by the eNB, the CSI process that contains more than one uncorrelated Tx beam.

Example 52 may include the method of example 50 or some other example herein, wherein two beam selectors are further reported associated with the CSI.

Example 53 may include the method of example 50 or some other example herein, wherein reported CSI are measured in power based interpolated Tx beams.

Example 54 may include the method of example 50 or some other example herein, wherein the power-based beam interpolation is based on a 1 bit flag that is used in a CSI process configuration in radio resource control (RRC), wherein a first value of the flag indicates power-based beam-interpolation is enabled, and a second value of the flag indicates power-based beam interpolation is disabled.

Example 55 may include the method of example 16 or some other example herein, wherein the angle-based beam interpolation and power-based beam interpolation are enabled simultaneously.

Example 56 may include the method of example 55 or some other example herein, wherein the angle-based beam interpolation and/or power-based beam interpolation are based on a Reference Signal Receiving Power (RSRP) threshold.

Example 57 may include the method of example 56 or some other example herein, wherein the RSRP threshold is based on RRC signaling.

Example 58 may include the method of example 56 or some other example herein, wherein if the RSRP is lower than the RSRP threshold, angle-based beam interpolation is enabled, and/or if the RSRP is higher than the RSRP threshold, power-based beam interpolation is enabled.

Example 59 may include an evolved NodeB (eNB) comprising: baseband circuitry to: identify two or more transmission (Tx) beams; and generate one or more additional Tx beams based on angle-based beam interpolation or power-based beam interpolation; and radio frequency (RF) circuitry to transmit one or more signals on the two or more Tx beams and/or the one or more additional Tx beams.

Example 60 may include the eNB of example 59 or some other example herein, wherein the angle-based beam interpolation is based on an indication of an angle based beam interpolator that is reported within a channel state information (CSI) process.

Example 61 may include the eNB of example 60 or some other example herein, wherein the CSI process may related to more than one correlated Tx beam, and two beam selectors may be reported in the CSI process, and a beam selector may indicate a selected beam with the Tx beams of the CSI process, and the angle-based beam interpolation may be based on the selected beam(s).

Example 62 may include the eNB of example 60 or some other example herein, wherein the angle-based beam interpolation is based on a 1 bit flag that is used in a CSI process configuration in radio resource control (RRC), wherein a first value of the flag indicates this CSI process requires angle based beam interpolator and two beam selectors feedback and another value of the flag indicates the angle based beam interpolator are not used and one beam selector may be reported.

Example 63 may include the eNB of example 59 or some other example herein, wherein the power-based beam interpolation is based on an indication of a power based beam interpolator that is reported within a channel state information (CSI) process.

Example 64 may include the eNB of example 63 or some other example herein, wherein the baseband circuitry is further to configure the CSI process that contains more than one uncorrelated Tx beam.

Example 65 may include the eNB of example 63 or some other example herein, wherein two beam selectors are further reported associated with the CSI.

Example 66 may include the eNB of example 63 or some other example herein, wherein reported CSI are measured in power based interpolated Tx beams.

Example 67 may include the eNB any example herein, wherein the power-based beam interpolation is based on a 1 bit flag that is used in a CSI process configuration in radio resource control (RRC), wherein a first value of the flag indicates power-based beam-interpolation is enabled, and a second value of the flag indicates power-based beam interpolation is disabled.

Example 68 may include the eNB of example 59 or some other example herein, wherein the angle-based beam interpolation and power-based beam interpolation are enabled simultaneously.

Example 69 may include the eNB of example 68 or some other example herein, wherein the angle-based beam interpolation and/or power-based beam interpolation are based on a Reference Signal Receiving Power (RSRP) threshold.

Example 70 may include the eNB of example 69 or some other example herein, wherein the RSRP threshold is based on RRC signaling.

Example 71 may include the eNB of example 69 or some other example herein, wherein if the RSRP is lower than the RSRP threshold, angle-based beam interpolation is enabled, and/or if the RSRP is higher than the RSRP threshold, power-based beam interpolation is enabled.

Example 72 may include a method comprising: measuring, by a user equipment (UE), a channel state information (CSI) processes set that includes at least two CSI processes; identifying, by the UE, a 1-bit flag in a radio resource signaling (RRC) message that includes an indication of a configuration of the CSI processes set; reporting, by the UE based on a value of the 1-bit flag, two different beam selectors for the two CSI processes; and receiving, by the UE based on the reporting, a transmission (Tx) beam that was interpolated based on angle-based interpolation or power-based interpolation.

Example 73 may include the method of example 72 or some other example herein, wherein a first value of the 1-bit flag indicates that the UE is to report two different beam selectors for the CSI processes, and another value of the 1-bit flag indicates that there is no restriction the reported two beam selectors.

Example 74 may include the method of example 72 or some other example herein, wherein the two reported CSI processes are based on measurements according to two Tx beams indicated by the two beam selectors.

Example 75 may include a user equipment (UE) comprising: baseband circuitry to: measure a channel state information (CSI) processes set that includes at least two CSI processes; and radio frequency (RF) circuitry coupled with the baseband circuitry, the RF circuitry to: transmit, based on a value of a 1-bit flag, a report related to two different beam selectors for the two CSI processes; and receive, a transmission (Tx) beam that was interpolated based on angle-based interpolation or power-based interpolation.

Example 76 may include the UE of example 75 or some other example herein, wherein the 1-bit flag is in a radio resource signaling (RRC) message that includes an indication of a configuration of the CSI processes set.

Example 77 may include the UE of example 75 or some other example herein, wherein a first value of the 1-bit flag indicates that the UE is to report two different beam selectors for the CSI processes, and another value of the 1-bit flag indicates that there is no restriction the reported two beam selectors.

Example 78 may include the UE of example 75 or some other example herein, wherein the two reported CSI processes are based on measurements according to two Tx beams indicated by the two beam selectors.

Example 79 may include an apparatus comprising means to perform one or more elements of a method described in or related to any of examples 1-48, or any other method or process described herein.

Example 80 may include one or more non-transitory computer-readable media comprising instructions to cause an electronic device, upon execution of the instructions by one or more processors of the electronic device, to perform one or more elements of a method described in or related to any of examples 1-48, or any other method or process described herein.

Example 81 may include an apparatus comprising logic, modules, and/or circuitry to perform one or more elements of a method described in or related to any of examples 1-48, or any other method or process described herein.

Example 82 may include a method, technique, or process as described in or related to any of examples 1-48, or portions or parts thereof.

Example 83 may include a method of communicating in a wireless network as shown and described herein.

Example 84 may include a system for providing wireless communication as shown and described herein.

Example 85 may include a device for providing wireless communication as shown and described herein.

Further, in addition to the specific combinations of examples described above, any of the examples detailing further implementations of an element of an apparatus or medium may be applied to any other corresponding apparatus or medium, or may be implemented in conjunction with another apparatus or medium. Thus, each example above may be combined with each other example in various ways both as implementations in a system and as combinations of elements to generate an embodiment from the combination of each example or group of examples. For example, any embodiment above describing a transmitting device will have an embodiment that receives the transmission, even if such an embodiment is not specifically detailed. Similarly, methods, apparatus examples, and computer readable medium examples may each have a corresponding example of the other type even if such examples for every embodiment are not specifically detailed.

Example Systems and Devices

Figure 6:
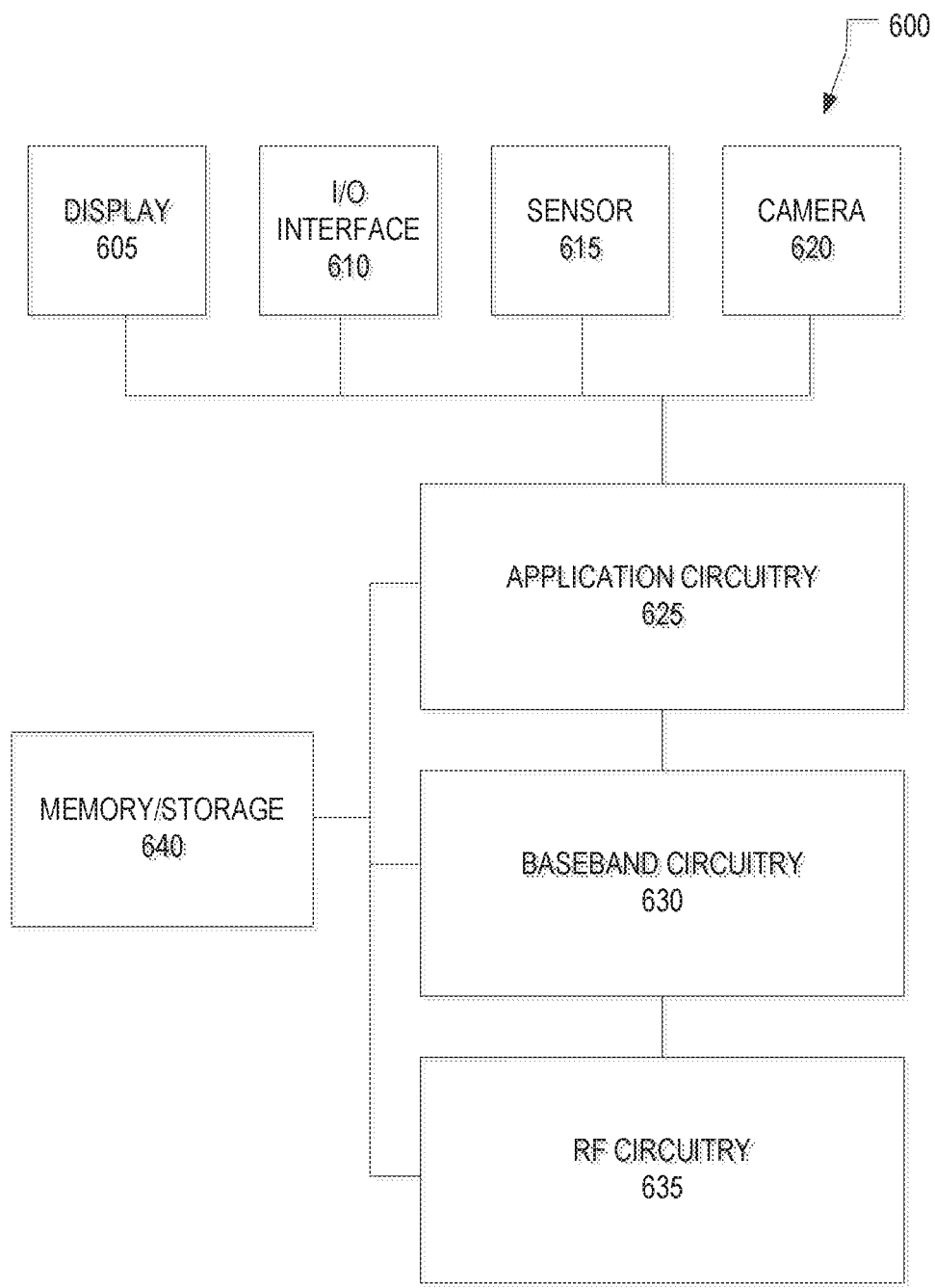
FIG. 6 illustrates aspects of a computing machine, according to some example embodiments.

FIG. 6 illustrates aspects of a computing machine according to some example embodiments. Embodiments described herein may be implemented into a system 600 using any suitably configured hardware and/or software. FIG. 6 illustrates, for some embodiments, an example system 600 comprising radio frequency (RF) circuitry 635, baseband circuitry 630, application circuitry 625, memory/storage 640, a display 605, a camera 620, a sensor 615, and an input/output (I/O) interface 610, coupled with each other at least as shown.

The application circuitry 625 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 640 and configured to execute instructions stored in the memory/storage 640 to enable various applications and/or operating systems running on the system 600.

The baseband circuitry 630 may include circuitry such as, but not limited to, one or more single-core or multi-core processors. The processor(s) may include a baseband processor. The baseband circuitry 630 may handle various radio control functions that enable communication with one or more radio networks via the RF circuitry 635. The radio control functions may include, but are not limited to, signal modulation, encoding, decoding, radio frequency shifting, and the like. In some embodiments, the baseband circuitry 630 may provide for communication compatible with one or more radio technologies. For example, in some embodiments, the baseband circuitry 630 may support communication with an evolved universal terrestrial radio access network (EUTRAN), other wireless metropolitan area networks (WMANs), a wireless local area network (WLAN), or a wireless personal area network (WPAN). Embodiments in which the baseband circuitry 630 is configured to support radio communications of more than one wireless protocol may be referred to as multi-mode baseband circuitry.

In various embodiments, the baseband circuitry 630 may include circuitry to operate with signals that are not strictly considered as being in a baseband frequency. For example, in some embodiments, the baseband circuitry 630 may include circuitry to operate with signals having an intermediate frequency, which is between a baseband frequency and a radio frequency.

The RF circuitry 635 may enable communication with wireless networks using modulated electromagnetic radiation through a non-solid medium. In various embodiments, the RF circuitry 635 may include switches, filters, amplifiers, and the like to facilitate the communication with the wireless network.

In various embodiments, the RF circuitry 635 may include circuitry to operate with signals that are not strictly considered as being in a radio frequency. For example, in some embodiments, the RF circuitry 635 may include circuitry to operate with signals having an intermediate frequency, which is between a baseband frequency and a radio frequency.

In various embodiments, the transmitter circuitry or receiver circuitry discussed above with respect to the UE or eNB may be embodied in whole or in part in one or more of the RF circuitry 635, the baseband circuitry 630, and/or the application circuitry 625.

In some embodiments, some or all of the constituent components of a baseband processor may be used to implement aspects of any embodiment described herein. Such embodiments may be implemented by the baseband circuitry 630, the application circuitry 625, and/or the memory/storage 640 may be implemented together on a system on a chip (SOC).

The memory/storage 640 may be used to load and store data and/or instructions, for example, for the system 600. The memory/storage 640 for one embodiment may include any combination of suitable volatile memory (e.g., dynamic random access memory (DRAM)) and/or non-volatile memory (e.g., flash memory).

In various embodiments, the I/O interface 610 may include one or more user interfaces designed to enable user interaction with the system 600 and/or peripheral component interfaces designed to enable peripheral component interaction with the system 600. User interfaces may include, but are not limited to, a physical keyboard or keypad, a touchpad, a speaker, a microphone, and so forth. Peripheral component interfaces may include, but are not limited to, a non-volatile memory port, a universal serial bus (USB) port, an audio jack, and a power supply interface.

In various embodiments, the sensor 615 may include one or more sensing devices to determine environmental conditions and/or location information related to the system 600. In some embodiments, the sensors 615 may include, but are not limited to, a gyro sensor, an accelerometer, a proximity sensor, an ambient light sensor, and a positioning unit. The positioning unit may also be part of, or interact with, the baseband circuitry 630 and/or RF circuitry 635 to communicate with components of a positioning network (e.g., a global positioning system (GPS) satellite). In various embodiments, the display 605 may include a display (e.g., a liquid crystal display, a touch screen display, etc.).

In various embodiments, the system 600 may be a mobile computing device such as, but not limited to, a laptop computing device, a tablet computing device, a netbook, an ultrabook, a smartphone, and the like. In various embodiments, the system 600 may have more or fewer components, and/or different architectures.

Figure 7:
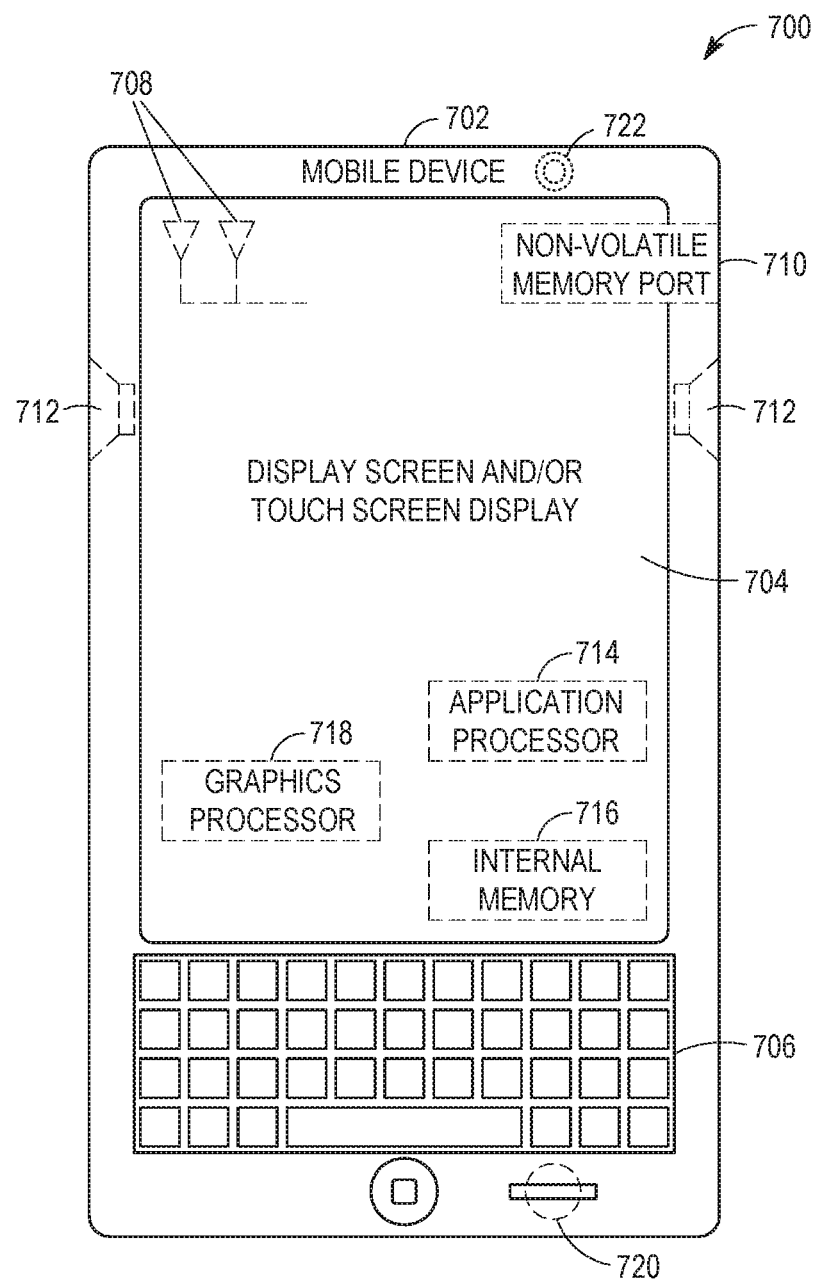
FIG. 7 illustrates aspects of a UE, in accordance with some example embodiments.

FIG. 7 shows an example UE, illustrated as a UE 700. The UE 700 may be an implementation of the UE 61, the eNB 150, or any device described herein. The UE 700 can include one or more antennas 708 configured to communicate with a transmission station, such as a base station (BS), an eNB, or another type of wireless wide area network (WWAN) access point. The UE 700 can be configured to communicate using at least one wireless communication standard including 3GPP LTE, WiMAX, High Speed Packet Access (HSPA), Bluetooth, and WiFi. The UE 700 can communicate using separate antennas for each wireless communication standard or shared antennas for multiple wireless communication standards. The UE 700 can communicate in a WLAN, a WPAN, and/or a WWAN.

FIG. 7 also shows a microphone 720 and one or more speakers 712 that can be used for audio input and output to and from the UE 700. A display screen 704 can be a liquid crystal display (LCD) screen, or another type of display screen such as an organic light emitting diode (OLED) display. The display screen 704 can be configured as a touch screen. The touch screen can use capacitive, resistive, or another type of touch screen technology. An application processor 714 and a graphics processor 718 can be coupled to an internal memory 716 to provide processing and display capabilities. A non-volatile memory port 710 can also be used to provide data I/O options to a user. The non-volatile memory port 710 can also be used to expand the memory capabilities of the UE 700. A keyboard 706 can be integrated with the UE 700 or wirelessly connected to the UE 700 to provide additional user input. A virtual keyboard can also be provided using the touch screen. A camera 722 located on the front (display screen) side or the rear side of the UE 700 can also be integrated into the housing 702 of the UE 700.

Figure 8:
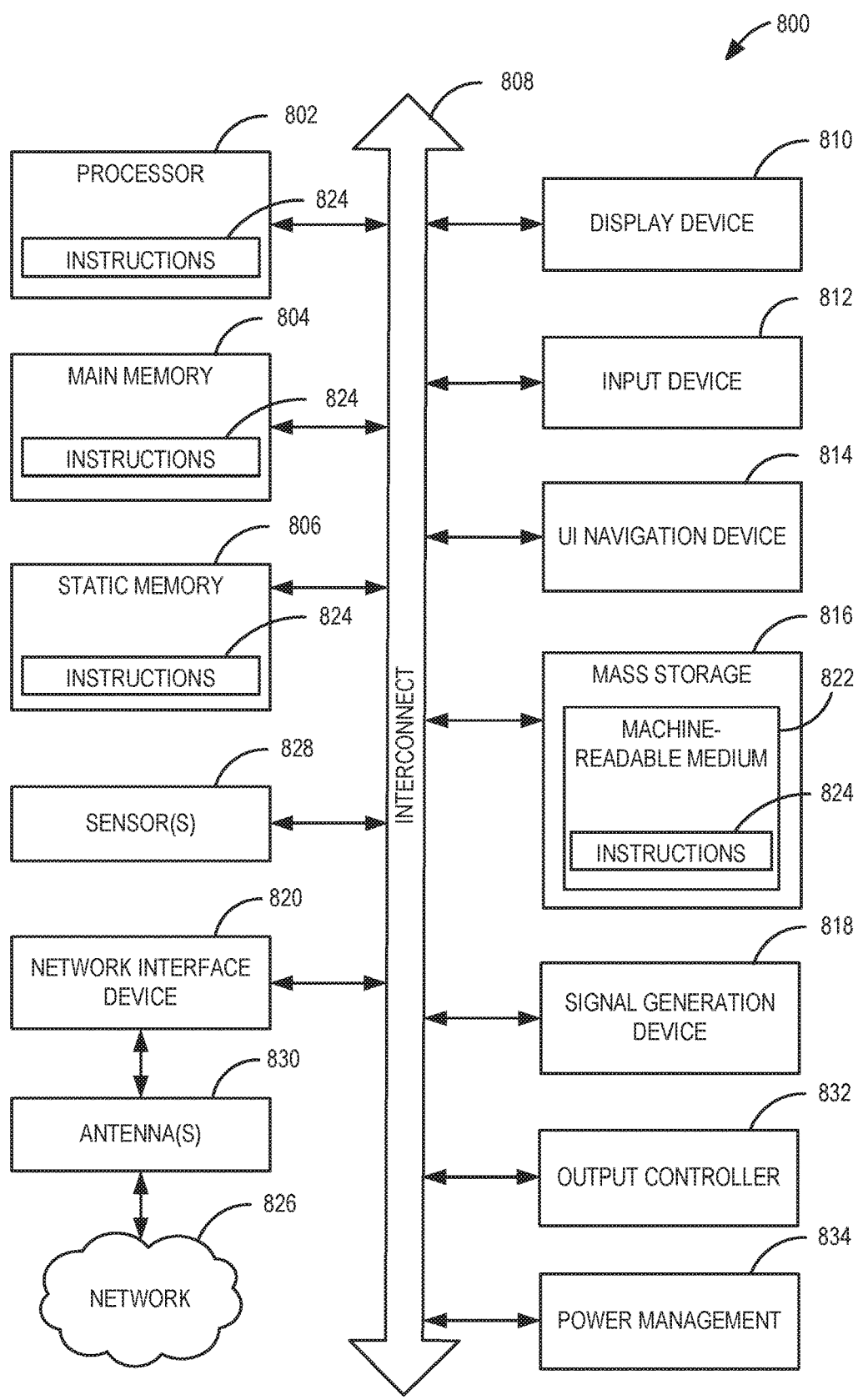
FIG. 8 is a block diagram illustrating an example computer system machine which may be used in association with various embodiments described herein.

FIG. 8 is a block diagram illustrating an example computer system machine 800 upon which any one or more of the methodologies herein discussed can be run, and which may be used to implement the eNB 150, the UE 61, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 800 includes a processor 802 (e.g., a central processing unit (CPU), a graphics processing unit (GPU), or both), a main memory 804, and a static memory 806, which communicate with each other via an interconnect 808 (e.g., a link, a bus, etc.).

The computer system machine 800 can further include a video display unit 810, an alphanumeric input device 812 (e.g., a keyboard), and a user interface (UI) navigation device 814 (e.g., a mouse). In one embodiment, the video display unit 810, input device 812, and UI navigation device 814 are a touch screen display. The computer system machine 800 can additionally include a mass storage device 816 (e.g., a drive unit), a signal generation device 818 (e.g., a speaker), an output controller 832, a power management controller 834, a network interface device 820 (which can include or operably communicate with one or more antennas 830, transceivers, or other wireless communications hardware), and one or more sensors 828, such as a GPS sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or processor 802 during execution thereof by the computer system machine 800, with the main memory 804, the static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 824 can further be transmitted or received over a communications network 826 using a transmission medium via the network interface device 820 utilizing any one of a number of well-known transfer protocols (e.g., hypertext transfer protocol HTTP). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, Erasable Programmable Read-Only Memory (EPROM), flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, Institute of Electrical and Electronic Engineers (IEEE) 802.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 802.16 (e.g., 802.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of PANs, LANs, and WANs, using any combination of wired or wireless transmission mediums.

Figure 9:
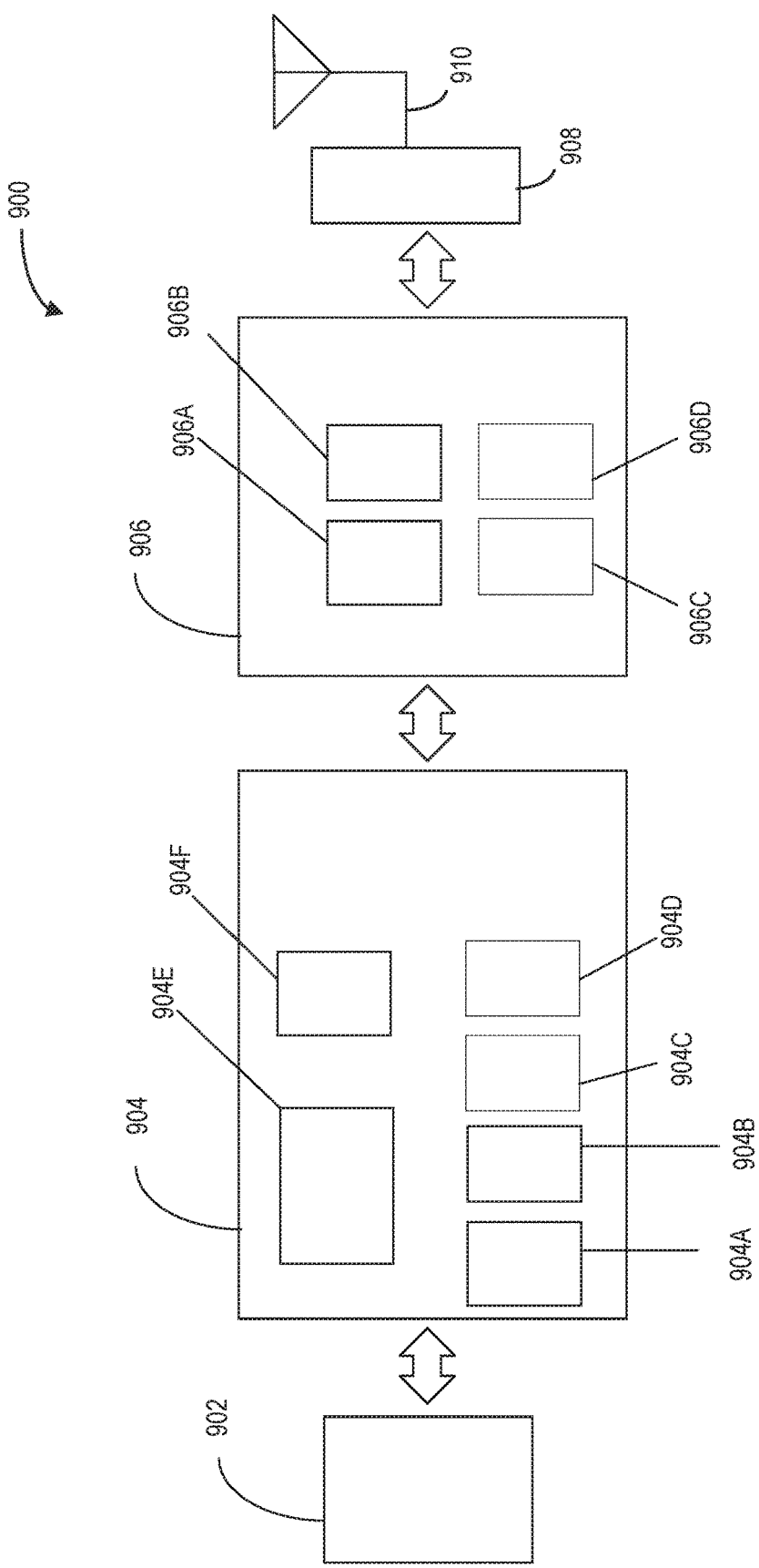
FIG. 9 is a block diagram illustrating an example user equipment including aspects of wireless communication systems which may be used in association with various embodiments described herein.

FIG. 9 illustrates, for one embodiment, example components of a UE device 900 in accordance with some embodiments. In some embodiments, the UE device 900 may include application circuitry 902, baseband circuitry 904, Radio Frequency (RF) circuitry 906, front-end module (FEM) circuitry 908, and one or more antennas 910, coupled together at least as shown. In some embodiments, the UE device 900 may include additional elements such as, for example, memory/storage, display, camera, sensor, and/or input/output (I/O) interface.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etcetera to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down conversion and/or up conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down conversion and/or direct up conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TRANSMISSION/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 comprises a plurality of power saving mechanisms. If the UE 900 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), RAM, semiconductor memory devices (e.g., EPROM, Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

It should be understood that the functional units or capabilities described in this specification may have been referred to or labeled as components or modules in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module are not necessarily be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. A non-transitory computer readable medium comprising instructions that, when executed by one or more processors, configure an evolved node B (eNB) to transmit to one or more user equipment (UEs) via a massive multiple-input multiple-output (MIMO) system of the eNB, the eNB configured to:
   transmit a first transmission beamformed reference signal using a first transmission beam associated with a first plurality of antennas of the eNB;
   transmit a second transmission beamformed reference signal using a second transmission beam associated with a second plurality of antennas of the eNB;
   receive, at the eNB from a first UE, a set of beam interpolation information; and
   generate, using the set of beam interpolation information, a first interpolated transmission for the first UE using an interpolated transmission beam from the first transmission beam and the second transmission beam.

2. The non-transitory computer readable medium of claim 1 wherein the instructions further configure the eNB to establish a radio resource control (RRC) connection for the interpolated transmission beam comprising the first transmission beam and the second transmission beam using RRC signaling, wherein the RRC signaling comprises the receipt of the set of beam interpolation information at the eNB.

3. The non-transitory computer readable medium of claim 2 wherein the instructions further configure the eNB to initiate a channel state information (CSI) process with the first UE prior to receipt of the set of beam interpolation information;
   wherein the set of beam interpolation information comprises a Channel Quality Indicator (CQI) for the first transmission beam, a first transmission beam Index (BI) value for the first transmission beam, and a second BI value for the second transmission beam.

4. The non-transitory computer readable medium of claim 3 wherein the set of beam interpolation information comprises Angle based Beam interpolation Indicator (ABI) data associated with interpolation factors $\alpha$ and $\beta$;
   wherein:

$\theta = \alpha\theta_1 + (1-\alpha)\theta_2$ $\varphi = \beta\varphi_1 + (1-\beta)\varphi_2$ wherein $\theta$ is a horizontal angle of the interpolated transmission beam used to transmit the first interpolated transmission;
   wherein $\theta_1$ is a horizontal angle of the first transmission beam;
   wherein $\theta_1$ is a horizontal angle of the second transmission beam;
   wherein $\varphi$ is a vertical angle of the interpolation transmission beam used to transmit the first interpolated transmission;
   wherein $\varphi_1$ is a vertical angle of the first transmission beam; and
   wherein $\varphi_2$ is a vertical angle of the second transmission beam.

5. The non-transitory computer readable medium of claim 4 wherein the ABI data consists of a two-bit value associated with an ABI table stored in the eNB.

6. The non-transitory computer readable medium of claim 5 wherein the set of beam interpolation information comprises Power based Beam interpolation Indicator (PBI) data associated with power interpolation factor $\gamma$;
   wherein:

$P = \sqrt{\gamma}P_1 + (1-\sqrt{\gamma})P_2$ wherein P is the interpolated transmission beam used to transmit the first interpolated transmission;
   wherein P1 is the first transmission beam; and
   wherein P2 is the second transmission beam.

7. The non-transitory computer readable medium of claim 6 wherein the PBI data comprises an N bit value associated with a corresponding power interpolation factor $\gamma$ value by the eNB.

8. The non-transitory computer readable medium of claim 7 wherein the N bit value is 1 and the corresponding power interpolation factor $\gamma$ value is 0.5.

9. The non-transitory computer readable medium of claim 8 wherein the set of beam interpolation information is received at the eNB from the first UE as a first RRC transmission comprising the ABI data and the PBI data.

10. The non-transitory computer readable medium of claim 8 wherein the set of beam interpolation information is received at the eNB from the first UE as a plurality of RRC transmissions, wherein a first RRC transmission of the plurality of RRC transmissions comprises the ABI data and wherein a second RRC transmission of the plurality of RRC transmissions comprises the PBI data.

11. The non-transitory computer readable medium of claim 10 wherein the set of beam interpolation information comprises first explicit antenna port (AP) identification data for antennas associated with the first channel and second explicit AP identification data for antennas associated with the second channel.

12. The non-transitory computer readable medium of claim 11 wherein the set of beam interpolation information comprises a fixed identifier associated with the interpolated transmission beam.

13. The non-transitory computer readable medium of claim 12 wherein the instructions further configure the eNB to transmit a beam interpolation enable indicator as Downlink Control Information (DCI) to the first UE prior to transmission of the first interpolated transmission.

14. The non-transitory computer readable medium of claim 13 wherein the instructions further configure the eNB to track errors associated with the interpolated transmission channel, and to transmit a beam interpolation disabled indicator to the first UE as second DCI when an error rate associated with the interpolated transmission channel exceeds a threshold error rate.

15. The non-transitory computer readable medium of claim 1 wherein the set of beam interpolation information is selected based on a CSI reporting type determined by comparing a Beamformed Reference Signal Receiving Power (BRS-RP) with a reporting type threshold value.

16. The non-transitory computer readable medium of claim 1 wherein the set of beam interpolation information is selected based on a CSI reporting type determined by comparing a Reference Signal Receiving Power (RSRP) with a first threshold value and a second threshold value, such that when the RSRP is above the first threshold, the set of beam interpolation information is associated with power based beam interpolation (PBI); and
   when the RSRP is below the second threshold, the set of beam interpolation information is associated with angle based beam interpolation (ABI), wherein the first threshold is no less than the second threshold, and wherein the first threshold and the second threshold are configurable via RRC signaling.

17. The non-transitory computer readable medium of claim 1 wherein the instructions configure the eNB to:

schedule a CSI process set comprising a first CSI process and a second CSI process, wherein each CSI process of the CSI process set reports a beam selection indicator (BSI), wherein each CSI process is associated with a corresponding Channel Quality Indicator (CQI);

determine that a first BSI of the first CSI process is different than a second BSI of the second CSI process; and initiate establishment of the interpolated transmission beam using radio resource control (RRC) signaling in response to the determination that the first BSI is different than the second BSI.

18. An apparatus of an evolved node B (eNB), the eNB configured for interpolated beam transmission using massive multiple-input multiple-output (MIMO), the apparatus comprising baseband circuitry configured to:

generate a first transmission beamformed reference signal for transmission on a first transmission beam using a first plurality of antennas of a massive MIMO antenna array of the eNB;

generate a second transmission beamformed reference signal for transmission on a second transmission beam using a second plurality of antennas of the massive MIMO antenna array of the eNB;

access a set of beam interpolation information from a first UE; and generate, based on the set of beam interpolation information, a first interpolated transmission using the first transmission beam and the second transmission beam.

19. The apparatus of claim 18 further comprising:

radio frequency (RF) circuitry configured to:

receive the set of beam interpolation from the first UE via an air interface; and transmit the first interpolated transmission via the air interface using the first plurality of antennas and the second plurality of antennas.

20. The apparatus of claim 18 wherein the baseband circuitry is further configured to determine that the first UE is in a coverage hole between the first transmission beam and the second transmission beam based on comparison of a first Beamformed Reference Signal Receiving Power (BRS-RP) measured from the first transmission beamformed reference signal with a first threshold value and a second BRS-RB measured from the second transmission beamformed reference signal with the first threshold value.

21. A non-transitory computer readable medium comprising instructions that, when executed by one or more processors, configure a user equipment (UEs) to receive communications from an evolved node B (eNB) via a massive multiple-input multiple-output (MIMO) system of the eNB, the UE configured to:

measure a first transmission beamformed reference signal on a first transmission beam associated with a first plurality of antennas of the eNB;

measure a second transmission beamformed reference signal a second transmission beam associated with a second plurality of antennas of the eNB;

generate, from the first transmission beamformed reference signal and the second transmission beamformed reference signal, a set of beam interpolation information; and receive, at the UE from the eNB, a downlink transmission using an interpolated beam generated from the first transmission beam and the second transmission beam.

22. The non-transitory computer readable medium of claim 21 wherein the set of beam interpolation information comprises Power based Beam interpolation Indicator (PBI) data associated with power interpolation factor $\gamma$;

wherein:

$$P=\sqrt{\gamma}P_1+(1-\sqrt{\gamma})P_2$$

wherein P is the interpolated transmission beam used to transmit the first interpolated transmission;

wherein P1 is the first transmission beam; and wherein P2 is the second transmission beam.

23. The non-transitory computer readable medium of claim 22 wherein the set of beam interpolation information further comprises Angle based Beam interpolation Indicator (ABI) data associated with interpolation factors $\alpha$ and $\beta$;

wherein:

$$\theta=\alpha\theta_1+(1-\alpha)\theta_2$$

$$\varphi=\beta\varphi_1+(1-\beta)\varphi_2$$

wherein $\theta$ is a horizontal angle of the interpolated transmission beam used to transmit the first interpolated transmission;

wherein $\theta 1$ is a horizontal angle of the first transmission beam;

wherein $\theta 1$ is a horizontal angle of the second transmission beam;

wherein $\varphi$ is a vertical angle of the interpolation transmission beam used to transmit the first interpolated transmission;

wherein $\varphi 1$ is a vertical angle of the first transmission beam; and wherein $\varphi 2$ is a vertical angle of the second transmission beam.

24. An apparatus of a user equipment (UE) for reception of transmissions from an evolved node B (eNB) using massive multiple-input multiple-output (MIMO) operations, the apparatus comprising:

baseband circuitry configured to:

process a first transmission beamformed reference signal from a first transmission beam associated with a first plurality of antennas of the eNB;

process a second transmission beamformed reference signal a second transmission beam associated with a second plurality of antennas of the eNB; and generate, from the first transmission beamformed reference signal and the second transmission beamformed reference signal, a set of beam interpolation information for transmission to the eNB using Radio Resource Control (RRC) signaling.

25. The apparatus of claim 24 further comprising:

one or more antennas;

radio frequency (RF) circuitry coupled to the one or more antennas and the baseband circuitry, the RF circuitry configured to:

receive the first transmission beamformed reference signal and the second transmission beamformed references signal;

transmit the set of beam interpolation information to the eNB; and receive a set of application data on an interpolated beam; and wherein the baseband circuitry is further configured to establish an active RRC connection via the interpolated beam using the first transmission beam and the second transmission beam based on the RRC signaling.

* * * * *